April 30, 1929.  L. D. SUMMERS  1,711,365
AUTOMATIC HEAT CONTROL AND BY-PASS DAMPER
Filed Sept. 22, 1927  2 Sheets-Sheet 1
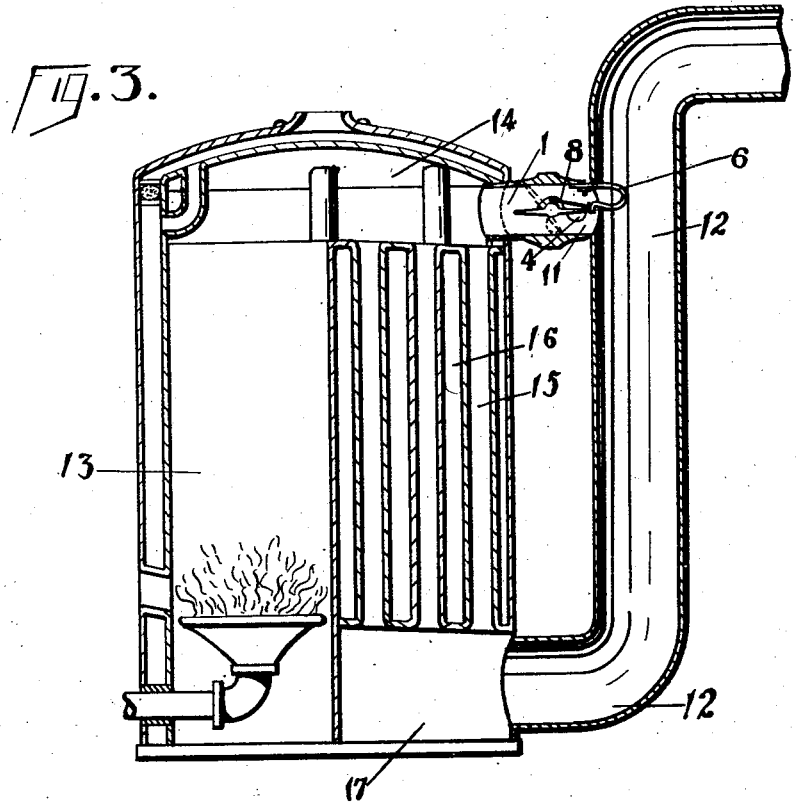
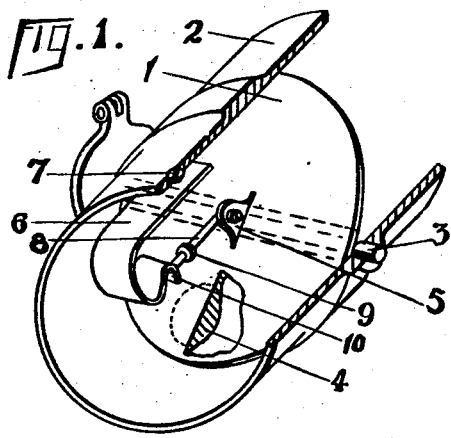
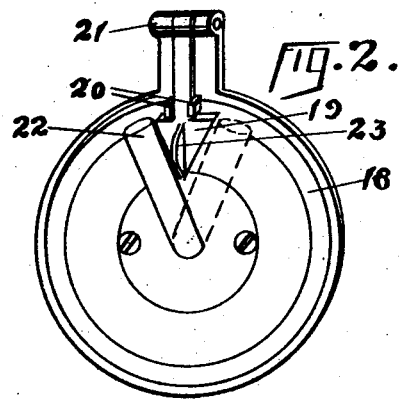
Louis D. Summers
INVENTOR.
BY A. B. McCall
ATTORNEYS.

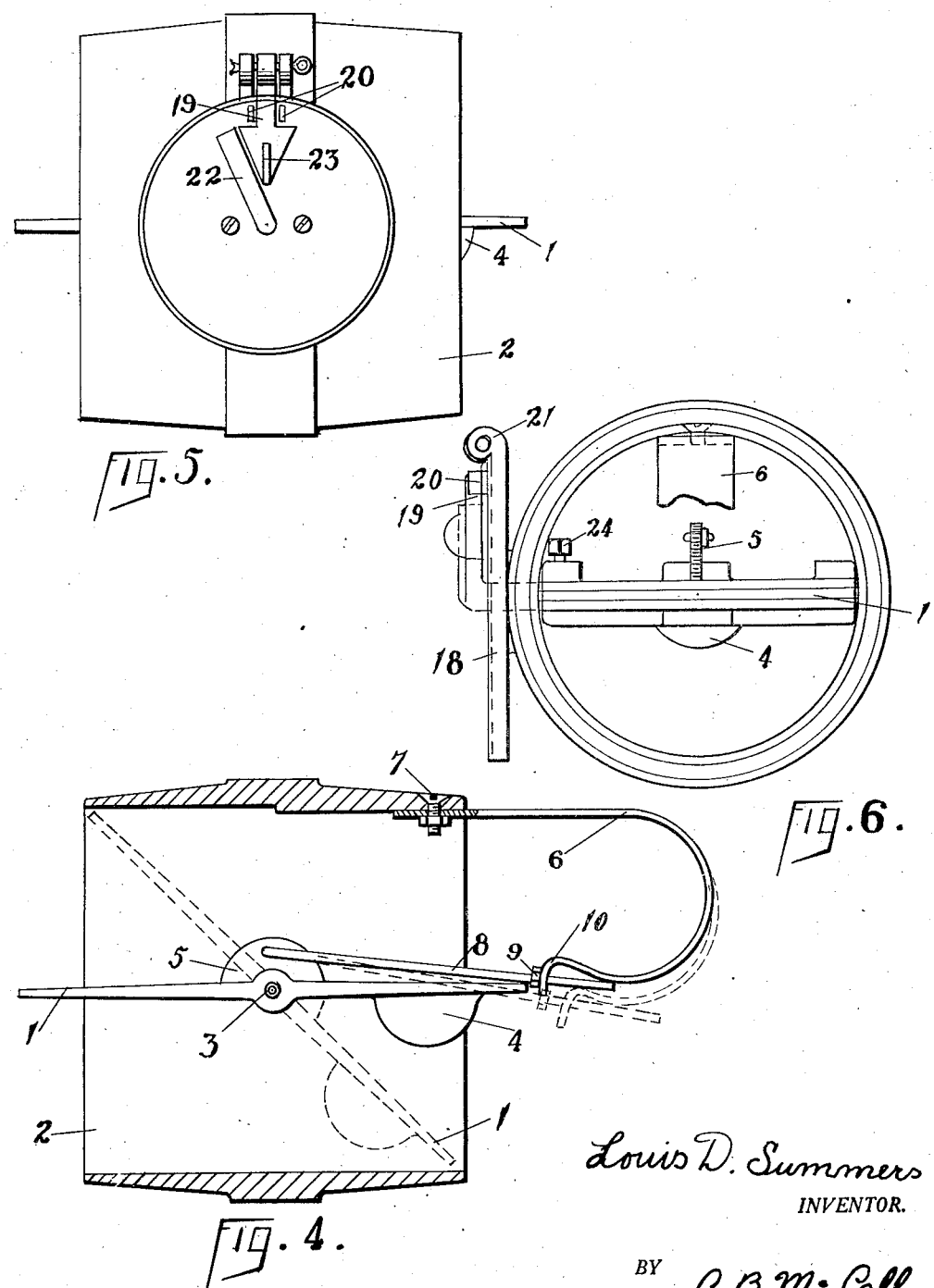

Patented Apr. 30, 1929.

1,711,365

UNITED STATES PATENT OFFICE.

LOUIS D. SUMMERS, OF DECATUR, ILLINOIS, ASSIGNOR TO LEADER IRON WORKS, OF DECATUR, ILLINOIS.

AUTOMATIC HEAT-CONTROL AND BY-PASS DAMPER.

Application filed September 22, 1927. Serial No. 221,367.

My invention relates to heat control dampers adapted to automatically control the temperature of the hot products of combustion in a heating plant as the gases pass from a boiler, furnace or economizer as they enter the house flue; an object being in this device particularly to provide a thermostatically controlled damper adapted to be actuated by the influence of heat on the bi-metal controlling element of the damper and especially to be so influenced in its action after being suitably prepared as to be able to keep the draught of the heating plant within predetermined active limits as determined by temperature levels of the gases having direct or indirect passage to the house chimney.

A further object of my invention is to provide an automatic by-pass damper for controlling heating plant draught that is so located, when in normal operation, that the controlling element in the damper may be influenced by the heat coming either from the direct draught pipe or from the upright flue pipe which takes the gases from the lower gas chamber of an economizer section of a heating plant to conduct them to the house flue.

A further object of my invention is to provide as an automatic heat control damper for a heating plant a by-pass damper adapted to be so actuated by existing temperatures as to automatically adjust itself in the direct draught pipe so as to give a heating plant a good start for the fire until a predetermined level of temperature is obtained in the smoke pipes; at which time the bi-metal control element permits the damper to be automatically adjusted through the influence of heat thereon to be closed; thus passing the flow of the hot products of combustion on their downward pass to the house chimney; and while moving the gases settle by heat stratification while giving up a greater percentage of their heat before leaving the heating plant from the lower gas chamber to enter the house flue, communicatively connected therewith.

A further object of my invention is to provide means for the automatic control of the temperatures of the hot products of combustion passing to the house chimney when the heating plant is in normal operation; whereby these temperatures, when passing may not drop below a predetermined optional level required for maintaining the heating plant with maximum efficiency.

I attain the objects of my invention in the automatic by-pass damper described in the annexed specifications and recited in the claims and illustrated in the accompanying drawings in which like reference numerals indicate like parts in the several figures.

Referring to the figures:

Fig. 1 is a perspective disclosing the structural details of the automatic by-pass damper of my invention.

Fig. 2 is a detail of the control device adapted to be used when it may be desired to set the damper by manual adjustment to an open or closed position.

Fig. 3 is a vertical half section of a heating plant showing how the automatic by-pass damper of my invention is adapted to control the movement of the hot products of combustion in the heating plant.

Fig. 4 shows a vertical half section of the metallic sleeve adapted to operatively support my damper and shows mounted therein the automatic by-pass damper of my invention.

Fig. 5 shows a side elevation of my invention including therewith the hand adjustment device adapted to be used for optionally adjusting the damper to an open or closed position and locked there.

Fig. 6 is an end view of my damper and the sleeve containing the same together with the manual adjustment device therefor.

In connection with my efforts to develop heating plants that will materially reduce the losses that are so common in the normal operation of heating plants, I attempt in some manner to use the principle of counterflow and stratification in effecting a transfer of heat from the products of combustion to the water or air in the heating plant where water, air or steam are used as the circulating medium for distributing heat. I have found in this connection that stack temperatures may be greatly reduced by providing in a heating plant a means of slowing down the movement of the hot gases and in so doing permitting them to settle to a lower level by gravity or heat stratification after first passing up from the fire box to an upper gas chamber where they register an intense application of heat on an upper water or air dome just before the heat conducting medium leaves the plant.

However in this effort to utilize a greater percentage of the heat of the gases by heat transfer before the gases are lost, I find it advisable to provide a means of boosting the fire by providing a direct draught at first until the fire gets a good start before I redirect the hot gases from the upper gas chamber down through the heat economizer section of the heating plant where the gases normally move slower while giving up in heat transfer a greater portion of their temperature.

To those experienced in heating plant regulation, it will be at once evident that it would be a loss of time and much inconvenience for the plant operator to have to always wait until the fire got started well before readjusting the drafts; and even then the conveniences and economy resulting from an automatic control would not be obtained.

In order therefore to suitably explain the function of my invention which serves as an automatic heat control and by-pass damper it may be well to explain that in the development of economizers, furnaces and boilers for oil, gas and coke fire the purpose has been to produce a heating plant capable of a high over-all efficiency which naturally means that these heating plants will effectually reduce the great losses of the hot gases that are commonly experienced in the normal operation of heating plants; and in saving for heat transfer the heat from these gases such plants when highly efficient will thus considerably lower therein the temperatures of the outgoing flue gases.

The heating engineer will understand that the draught intensity of any chimney depends on the temperatures obtaining in the gases passing out the chimney. In the past it has been considered that high efficiency in heat transfer could not be obtained without a high velocity of the moving products of combustion but in my experiments I have succeeded in reducing the temperatures of the gases on boilers, furnaces and economizers to a level that was so low that in some instances under existing conditions, I virtually eliminated draught in my method of using the counterflow and stratification principle of heat transfer. It would of course not be desirable or practical to get the stack temperatures thus down to such a low level.

However to overcome this condition and to aid in making my preferred construction of a heating plant decidedly practical and economical and to take care of the control thereof automatically I have developed what I prefer to call, as my invention, an automatic thermostatic by-pass damper.

This damper is so installed as to locate the controlling element which is actuated by the influence of heat thereon, where it may be effectively influenced by the gases that are passing through the direct draught pipe or by the gases that are coming from the lower gas chamber after having passed down through the economizing section of the heating plant.

For instance suppose the heating plant is perfectly cool, that is, not containing any fire and the boiler, furnace or economizer pipe connections are all down to what might be termed as atmospheric temperature. When in that condition my by-pass damper would thus stand open. If we now start a fire in the combustion chamber the hot gases emanating therefrom will flow in the easiest direction up through the upper gas chamber and out through the direct draught pipe to the house chimney as they pass through my automatic damper in the direct draught pipe where the temperatures of the gases coming in contact with the bi-metal expansion element of the damper thus cause the element to expand and gradually release the damper plate when the temperature effecting the same rises to a predetermined optional level thus permitting the counterbalanced damper plate to gradually close.

When entirely closed the element would then be influenced only by the gases that leave the lower gas chamber and enter the flue communicating with the house chimney. In case these gases for instance, were in temperatures lower than desired the expansion element would gradually contract and in doing so slowly open the damper plate until gases emanating directly from the combustion chamber would again be brought in contact with the expansion element; thus causing the damper to become neutral in its control position until such a condition arises as where the gas coming from the lower part of the economizer section may not be of sufficient temperature, let us say 200 degrees; then the damper will partly open admitting some of the hot gases by the damper through the direct gas flow pipes thus to join with the gases from the lower gas chamber until a temperature of about 200 degrees would be established. In case the gas from the bottom part of the economizer however is coming up over, for example, 200 degrees then the expansion element is fully expanded and the damper plate completely released and closed. Thus it is that I accomplish with my invention an automatic control of the heat in the chimney of a heating plant.

Referring now to the details of construction of my invention and the method of operating the same I provide; a damper plate —1— pivotally and operatively mounted within a substantial tubular sleeve —2— on a supporting pin —3—. This damper plate —1— is provided with an integral counterbalance —4— and an integral arched lug —5— adapted to aid in the automatic control of the plate.

Substantially secured to tubular sleeve —2— by bolt —7— is a bi-metal spring member having just such a combination of metallic constituents as will make it expand and tend to straighten out under the influences of heat at predetermined temperature levels and tending to curl up effectively when it gets cold.

The bi-metal element has slidably attached thereto a relatively small connecting pin member —8— pivotally attached to arched lug —5— and provided with a stop member —9— to limit the sliding adjustment of the bi-metal control element —6— thereon.

When in normal operation, therefore, with no heat applied to the temperature-controlled bi-metal element —6— its tendency to contract and curl up will cause the same to slidably move up on pin —8— at the free end —10— of the control element until the free end thereof comes in contact with stop member —9— where it tends to push back on the pin thus pivotally moving plate —1— rotatably to an open position through the action of pin —8's— eccentric connection therewith as attached to lug —5—.

On the other hand should this contracting influence of the cold be relieved from bi-metal element —6— and cause this element to slidably move back at its free end away from stop member —9— on pin —8— then damper plate —1— will normally drop pivotally to a closed position because of the integral counterbalance —4— carrying the end of the plate of which it is a part down by gravity.

The expansion of bi-metal element —6— is caused by the influence of high temperature heat coming in contact therewith. In mounting my automatic by-pass heat control damper I mount it in a position in the smoke pipes of a heating plant in which it is adapted to make the damper most efficient in the effective automatic control of the heating plant.

For the sake of explanation, therefore, of the arrangement whereby I secure the best results with my damper I prefer to use the same in a heating plant provided with an economizer section wherein the principle of counterflow and heat stratification in heat transfer from the products of combustion is carried out and the preferred arrangement in this connection for my purposes is to place the damper with its sleeve mounting therefor in a direct draught pipe —11— so as to permit bi-metal element —6— to be in line with the movement of the products of combustion passing to the house chimney either through direct draught pipe —11— or smoke pipe —12— and the normal action of my damper when properly installed in a furnace, boiler or heating plant as disclosed in Fig. 3, is preferably as follows:

When the hot products of combustion emanating from combustion chamber —13— approach the house chimney through upper gas chamber —14— and through direct draught pipe —11— they come in contact with bi-metal damper control element —6— which is cold normally and somewhat curled and contracted where, through its connection with damper plate —1— it tends to pivotally urge this plate to a normally horizontal position leaving the direct draught pipe —11— stand open for a draught and the free movement of the hot gases.

However, after the hot gases have come in contact with bi-metal control element —6— for a short period of time causing the same to expand and tend to straighten out the free end of the control element, being only slidably attached to pin —8—, slips back on the free end of pin —8—, thus releasing plate —1— permitting the same to pivotally rotate downward through the gravity action of counterbalance —4— effectively closing the draught through pipe —11— and passing the hot products of combustion downward where they ultimately reach the house chimney.

When making suitable adjustment of my automatic by-pass damper, I use a manual control arrangement adapted to lock pin —3— so that optional adjustment may be made in the damper within predetermined limits.

It will be seen, therefore, that by observing Fig. 2, or Fig. 5, that a plate member —18— has pivotally mounted thereon a stop member —19— adapted to normally rest within holding members —20— and hang suspended in a pivot support —21— therefor. This arrangement is provided in order to make it possible to set the draught plate as the operator may desire, either open or closed. In this connection it will be noticed that supporting pin —3— having a right angularly disposed lever —22— for its manual control may be adjusted so as to come in contact with one side of stop member —19— to hold the draught plate —1— locked open and then when it is desired to move the draught plate to a closed position and hold it here, stop member —19— is pivotally moved out of the way by taking hold of handle —23— and lifting the stop member out away from plate —18— and pivotally rotating pin —3— by moving lever —22— thereof over to the other side of stop member —19— and then dropping the stop member back into its normal resting position between twin holding members —20—; thus holding the damper closed.

Plate —1— is pivotally attached and supported on pin —3— and secured thereto by set screw —24—. In the dotted lines of Figure 4 there is shown plate —1— in its position when closing the draught where it is held down by counterbalance —4—.

To the heating engineer it will be evident that minor details of construction of my invention may be changed and stay within the spirit and scope of my invention but the preferred arrangement of operating details has been herein above described and illustrated in the accompanying drawings.

Having thus described the nature of my invention what I claim is:

1. An automatic heat control and by-pass damper comprising in combination a sleeve normally disposed horizontally, a weighted damper plate, pivotally mounted therein, a heat control bi-metal element secured within the sleeve, a control push rod operatively connected with said damper plate pivotally, provided with a limited stop member near the free end thereof and slidably connected with said bi-metal element; whereby contraction of the heat element tends to move the damper plate to an approximate horizontal plane by a thrust urgency against said stop member of the push rod and whereby the expansion of said heat element tends to release the damper plate permitting it to move slowly by gravity to a pivotal position that will close the hot gas passage through said sleeve.

2. An automatic heat control and by-pass damper comprising in co-operative combination a weighted damper plate pivotally mounted within a sleeve, a bi-metal heat control element controllably connected with said damper plate and operatively supported by and within said sleeve for opening the damper plate by contraction of the bi-metal element through a thrust movement thereof and slidably movable from control contact with said damper plate through the expansion of the bi-metal element.

3. As a new article of manufacture an automatic heat control and by-pass damper comprising a weighted damper plate operatively mounted within a detachable sleeve and controllably connected with a thermally actuated bi-metal expansive member through a push rod; said expansive element supported by and within said sleeve and slidably connected with said push rod for automatically lifting said damper plate pivotally to a relatively horizontal and open position by a thrust movement caused by contraction of the expansive element and automatically releasing said lifting strain by the thermostatic expansion of said bi-metal element causing said weighted damper plate to slowly move down pivotally to a closed position through the influence of gravity as the bi-metal element expands; and means for optionally fixing said damper plate to predetermined positions defining predetermined limits of movement for the automatic control of the damper.

4. An automatic heat control and by-pass damper comprising in combination a weighted pivotally mounted damper plate, a shouldered metallic sleeve inclosing and supporting said damper plate and tapering at the ends beyond the shoulders thereof, a bi-metal heat control member secured by one of its ends to the inner wall of said sleeve, extending in a loop substantially beyond the end of the sleeve and terminating in an apertured shoulder; a push rod operatively connecting said damper plate with said bi-metal element by a pivot connection with the damper and a sliding connection with the bi-metal element through the aperture in the free end of said element; and a shoulder on said rod to provide operative stop means for said bi-metal element when by the curling contraction of the element under relatively lower temperatures said damper is opened by the contracting strain of the element against said stop member of the push rod.

5. The combination with a heating unit operating on the counterflow principle of heat transfer, having a combustion chamber and an economizer counterflow section having an upper gas chamber communicating with a gas by-pass flue and a lower gas chamber having a gas discharge flue communicably connecting with said by-pass flue, and a house stack of a bi-metal actuated thermostatic damper operatively supported within said by-pass flue in a position to cause the bi-metal element thereof to register in joint alignment within both said by-pass flue and said gas discharge flue of the lower gas chamber at the junction point thereof to permit gases of unlike temperature from either flue to strike the bi-metal control element of the damper as said gases move out to a house flue.

6. In a counterflow heating unit and economizer having communicating upper and lower gas chambers each with gas outlets normally carrying gases of unlike temperature, when used, the combination comprising an approximately horizontal flue pipe connected with said upper gas outlet, an upright gas discharge flue pipe connected with said lower gas outlet and communicably connected with said by-pass flue pipe at an angle and a thermostatic damper including a weighted damper plate and a bi-metal heat control element operatively connected therewith, said damper operatively mounted within a detachable sleeve so as to make a major portion of the element extend beyond the sleeve; said damper operatively supported adjacent the end of said by-pass flue pipe in a position to locate said bi-metal element at the point of intersection of said connected gas discharge flues so as to bring the gases from either of said flues in contact with said mi-metal element as the gases pass on to a house flue.

In witness whereof, I hereunto set my hand this 31s' day of August, A. D. 1927.

LOUIS D. SUMMERS.